United States Patent [19]
Jewell et al.

[11] Patent Number: 5,523,884
[45] Date of Patent: Jun. 4, 1996

[54] OPTICAL BEAM DELIVERY SYSTEM

[75] Inventors: Jack L. Jewell; Greg R. Olbright, both of Boulder, Colo.

[73] Assignee: Vixel Corporation, Broomfield, Colo.

[21] Appl. No.: 194,019

[22] Filed: Feb. 9, 1994

Related U.S. Application Data

[62] Division of Ser. No. 978,391, Nov. 18, 1992, Pat. No. 5,319,496.

[51] Int. Cl.$^6$ ............................................. G02B 27/30
[52] U.S. Cl. .......................... 359/641; 359/642; 359/663
[58] Field of Search .................................... 359/741, 641, 359/642, 663

[56] References Cited

U.S. PATENT DOCUMENTS

| | | | |
|---|---|---|---|
| 4,934,783 | 6/1990 | Jacobson | 385/25 |
| 4,936,665 | 6/1990 | Whitney | 359/741 |
| 5,112,122 | 5/1992 | Chikuma et al. | 359/332 |

*Primary Examiner*—Georgia Y. Epps
*Assistant Examiner*—Michael A. Papalas
*Attorney, Agent, or Firm*—Fisher & Associates

[57] ABSTRACT

The present invention is directed to an optical system which includes an image region having at least one light source which directs a beam of light along an optical axis and an object region which is adapted to receive the light from the light source. An optical delivery system is between the image region and object region. The optical delivery system receives the light from the image region and directs it to the object region. The optical delivery system is formed of a plurality of optical elements, such as lenses and volume holograms. The optical delivery system is designed to either receive a plurality of beams of light from a plurality of sources or different modes of a single light source and form a single spot of light in the image region having the combined power of all of the beams of light or modes of a single beam. The optical delivery system can also condense or expand the spacing between the beams of light from a plurality of light sources. The optical delivery system is designed so that the Lagrange invariant thereof at the object region is different from the Lagrange invariant thereof at the image region.

12 Claims, 4 Drawing Sheets

OPTICAL BEAM DELIVERY SYSTEM

This invention was made with Government support under Contract F49620-92-C-0053 awarded by the Air Force. The Government has certain rights in this invention.

This application is a division of application Ser. No. 07/978,391, filed Nov. 18, 1992, which was issued as U.S. Pat. No. 5,319,496 on Jun. 7, 1994.

BACKGROUND OF THE INVENTION

1. Field of the Invention

The present invention relates to a system for delivering an optical beam from a beam source to a device for using the beam, and, more particularly, to a system for either providing a beam of higher power or of a different size.

2. Description of the Prior Art

There are many commercial systems which use a beam of light in the operation of the system. Such systems include optical communication systems, optical printing systems and optical memory devices for computers. The optical source generally used in these systems is a semiconductor laser diode. Such laser diodes are small and provide a beam of relatively collimated light. However, a problem with such laser diodes is that they are limited in the power of the light beam that they emit. Making the laser diode larger so as to emit a higher power beam has the problem that the beam of light is also larger in diameter. This can be a problem when the device into which the beam is being directed is small in diameter, such as an optical fiber, because the larger laser diodes tend to lase with multiple transverse modes, whose outputs are not readily focused to small diameters. Attempts have been made to increase the power of the beam provided by using a plurality of laser diodes and through optical devices, such as lenses, compress the plurality of beams into a single beam having the power of the combined beams. However, using standard optical devices, such as lenses, etc., it has not been possible to achieve a single beam of small diameter. If the beams from a plurality of spaced laser diodes are directed through a single lens, the beams will pass through different portions of the lens which causes the beams to go in different directions. The lens may form each beam at a fine point at the image plane of the system, but the beams will be spaced apart. The beams will cross each other at the focal plane of the lens to form a single spot, but the spot formed is large in diameter at the focal plane. Thus, a small diameter combined beam is not achieved by the single lens. Also, there are times when it is desired to expand or compress the size of a plurality of beams emitted by a plurality of light sources without expanding or compressing the beam diameters by a similar amount. This has been found difficult to do with standard optical devices.

SUMMARY OF THE INVENTION

The present invention relates to an optical system which includes an optical delivery device between an object region and an image region. The object region has at least one, and preferably a plurality of light sources, such as laser diodes, which direct light beams from the object region through the optical delivery device to the image region. The optical delivery device is designed to combine a plurality of light beams from the object region into a single spot of light in the image region with the spot of light having the power of the combined beams of light. The optical delivery device can also compress or expand the distance between a plurality of beams of light so that the beams of light are either closer together or further apart in the image region than they are in the object region.

More particularly, the present invention relates to an optical system which includes an object region having at least one light source which is adapted to direct a beam of light along an optical axis with the light having one ray which has a maximum angle $w_o$ with respect to the optical axis and another ray originating parallel to the optical axis at a maximum distance $y_o$ from the optical axis. The optical system also includes an image region adapted to receive the light from the object region with the one ray crossing the optical axis of the image region at a maximum angle $w_i$ to the optical axis and the other ray passing through the image region at a maximum distance $y_i$ from the optical axis. An optical delivery system receives the beam of light from the object region and delivers the light to the image region with $y_o w_o$ being different from $y_i w_i$.

BRIEF DESCRIPTION OF THE DRAWINGS

The invention will be further described in conjunction with the accompanying drawings, in which.

DETAIL DESCRIPTION OF THE PREFERRED EMBODIMENT

Figure 1:
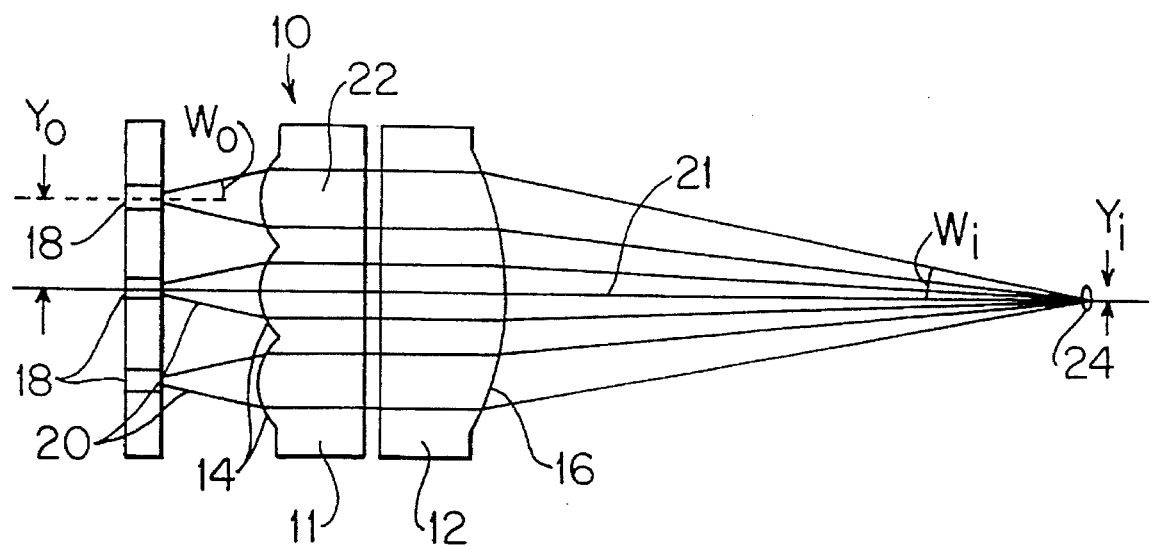
FIG. 1 is a schematic view of an optical system in accordance with the present invention for focusing a plurality of beams to a single spot.

With reference to the figures, wherein like reference characters indicate like elements throughout the several views and, in particular to FIG. 1, there is shown an optical system 10 in accordance with the present invention for focusing a plurality of beams to a single spot. The system 10 includes an optical delivery system comprising a micro lens 11 and macro lens 12. Micro lens 11 has a plurality of micro (small) lenses 14 spaced along one surface thereof, and a single macro (large) lens surface 16 opposite the micro lenses 14. Although the lenses are illustrated as separate units, they could be combined into a single unit with the micro lenses and macro lens on opposite surfaces of the unit. A plurality of light sources 18, such as semiconductor laser diodes, are arranged facing the micro lenses 14 and providing an object region. Each of the light sources 18 is arranged so that the rays of its beam of light 20 are directed substantially parallel to the optical axis 21 into a separate one of the micro lenses 14. Each of the micro lenses 14 is designed so that it converts the beam of light 20 from its respective light source 18 to a collimated beam of light 22 which is directed to the macro lens 16. The macro lens surface 16 is designed so that it directs all of the collimated beams of light 22 to a single spot 24 at the optical axis 21 in an image region. This provides a single beam of light of small diameter having the power of the total power of all the beams 20 emitted by the light sources 18.

For a single refracting surface having light passing therethrough from an object at one side of the surface to an image of the object at the other side of the surface, the Lagrange invariant is as follows:

$$y_o w_o = y_i w_i$$

where:

$y_o$=maximum height of object from the optical axis;

$w_o$=refractory index of object region times sine of maximum angle of the rays of the light from the optical axis;

$y_i$=maximum height of image from the optical axis; and $w_i$=refractory index of image region times sine of maximum angle of the rays of the light from the optical axis.

Thus, in a normal lens arrangement, the Lagrange invariant is constant on both sides of the lens. However, in the lens system 10 of the present invention, the Lagrange invariant is not equal on both sides of the lens. In fact, the Lagrange invariant on the object side of the lens is greater than the Lagrange invariant on the image side of the lens. The Lagrange invariant on the object side can be from 10% higher to at least twice as high as the Lagrange invariant on the image side. This can be true since the lens system 10 is formed of two different lens surfaces with a plurality of micro lens 14 on one surface and a single macro lens surface 16 on its opposite surface. This difference in the Lagrange invariant is necessary to achieve the compression of the multiple light sources into a single light source having the power of the combined light source.

EXAMPLE

For a system 10 as shown in FIG. 1, a lens 11 was used having micro lenses 14 80 micrometers in diameter and a single macro lens surface 16 250 micrometers in diameter. The image was a plurality of light sources 5 micrometers in diameter and spaced apart 85 micrometers. Thus, on the object side of the lens 11, $y_o$=85 micrometers and $w_o$=0.11 for a Lagrange invariant of 9.2 micrometers. However, on the image side it was found that $y_i$=7 micrometers and $w_i$=0.124 for a Lagrange invariant of 0.868 micrometers. Thus, the Lagrange invariant on the object side is greater than the Lagrange invariant on the image side.

Figure 2:
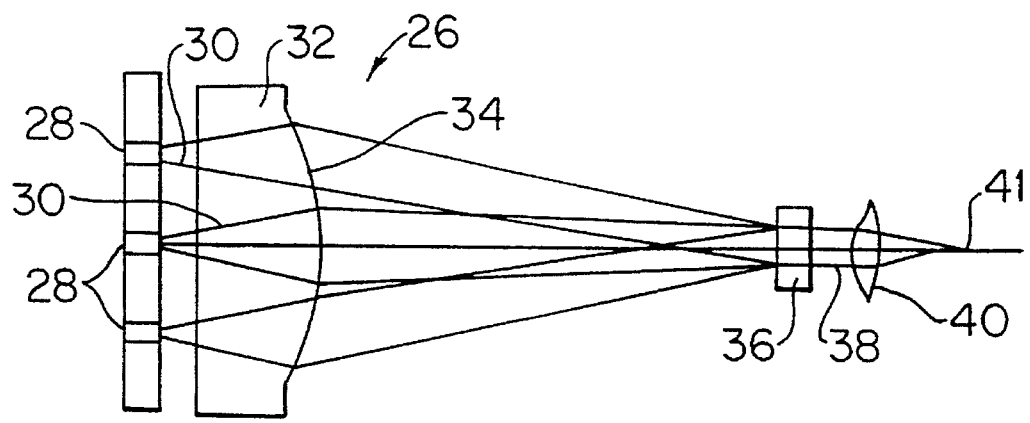
FIG. 2 is a schematic view of another optical system in accordance with the present invention for focusing a plurality of beams to a single spot.

Referring to FIG. 2, there is shown a schematic view of another optical system 26 in accordance with the present invention for focusing a plurality of beams to a single spot. Optical system 26 comprises an object region formed by a plurality of spaced light sources 28, such as individual laser diodes, directing their beams of light 30 to an image region through an optical delivery system. The optical delivery system comprises a lens 32 having a single curved surface 34 which directs all of the beams of light 30 to a single crossing plane at which is located a volume hologram 36. Volume hologram 36 is designed to direct all of the beams colinearly to provide a single collimated beam 38. The collimated beam 38 passes through a lens 40 which focuses the beam to a single spot 41 in the input region.

Figure 3:
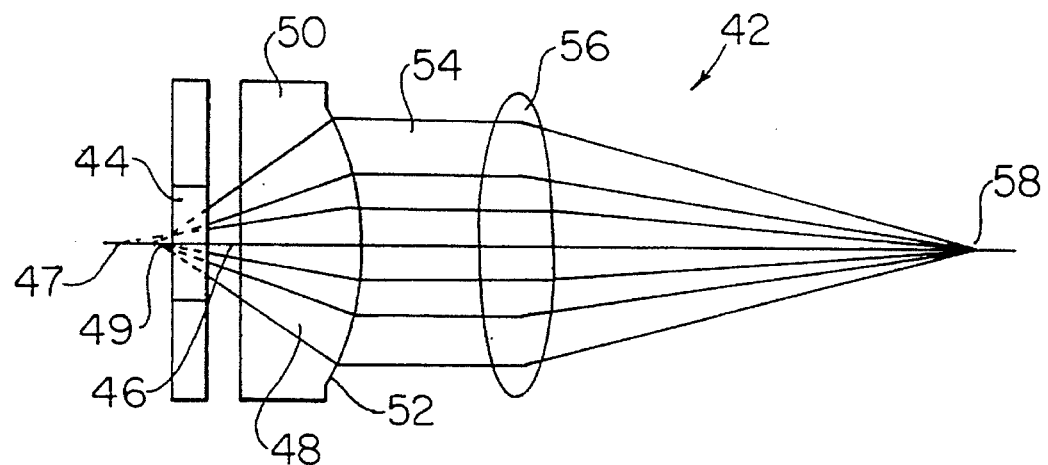
FIG. 3 is a schematic view of still another optical system in accordance with the present invention for focusing a plurality of beams to a single spot.

Referring to FIG. 3, there is shown a schematic view of still another optical system 42 for focusing a beam of light to a single spot. Optical system 42 comprises an object region having a single light source 44, such as a laser diode, which emits a light beam having different modes. The lower order mode 46 of the light source 44 is at the center of the beam whereas the higher order modes 48 are at the outer edge of the beam. The modes 46 and 48 of the beam extend in different directions from the source 44 and are directed into an optical delivery system. Light rays from lower order mode 46 appear to originate from point 47 while the rays from higher mode 48 appear to originate from point 49. The optical delivery system comprises a lens 50 having a curved surface 52 which refracts the beams so that they propagate as beams 54 parallel to the axis of the lens. The parallel beams 54 are then directed into a lens 56 which focuses the beams to a single spot 58 at an object region. The necessary charcteristic of curved surface 52, in order to collimate light beams appearing to originate from points 47 and 49, is spherical aberration, preferably equal to or greater than one half of an optical wavelength of the optical beam. Lenses 50 and 56 could be combined into a single lens.

Figure 4:
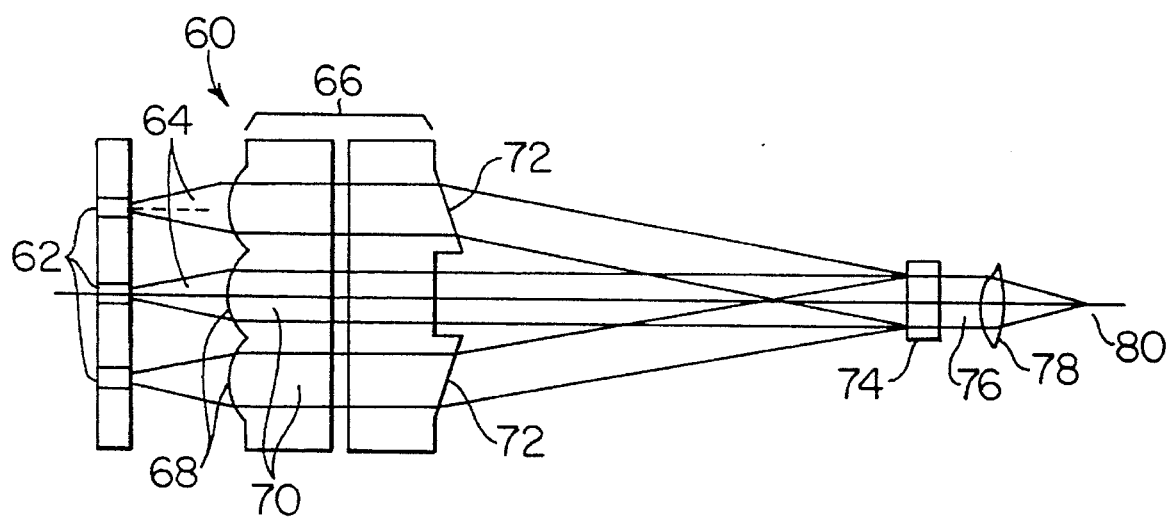
FIG. 4 is a schematic view of a further optical system in accordance with the present invention for focusing a plurality of beams to a single spot.

Referring now to FIG. 4, there is shown a schematic view of a further optical system 60 in accordance with the present invention for focusing a beam of light. Optical system 60 comprises an object region formed by a plurality of light sources 62, such as individual laser diodes, which direct their beams of light 64 to an optical delivery system. The optical delivery system comprises a lens 66 having on the surface thereof which faces the light sources 62 a plurality of curved micro lenses 68, one for each beam of light 64. The curved micro lenses 68 are designed to form the beams of light 64 to collimated beams 70 that pass through the lens 66. On the other surface of the lens 66 are a plurality of prismlets 72, one for each of the collimated beams 70. The prismlets 72 are designed to direct the collimated beams 70 to a plane at which all of the collimated beams cross each other. At this plane is a volume hologram 74 which directs all of the collimated beams parallel to the axis of the system. This provides a single beam 76 of large diameter. The beam 76 then passes through a lens 78 which focuses the beam 76 to a single spot 80 in an image region.

The optical system 60, like the optical system 26 shown in FIG. 2, focuses a plurality of beams from a plurality of light sources into a single beam having the combined power of the plurality of beams. The main advantage of the use of prismlets in the optical system 60 over the single lens 32 of the optical system 26 is that the prismlets work in the collimated parts of the beam and therefore do not introduce astigmatism.

Figure 5A:
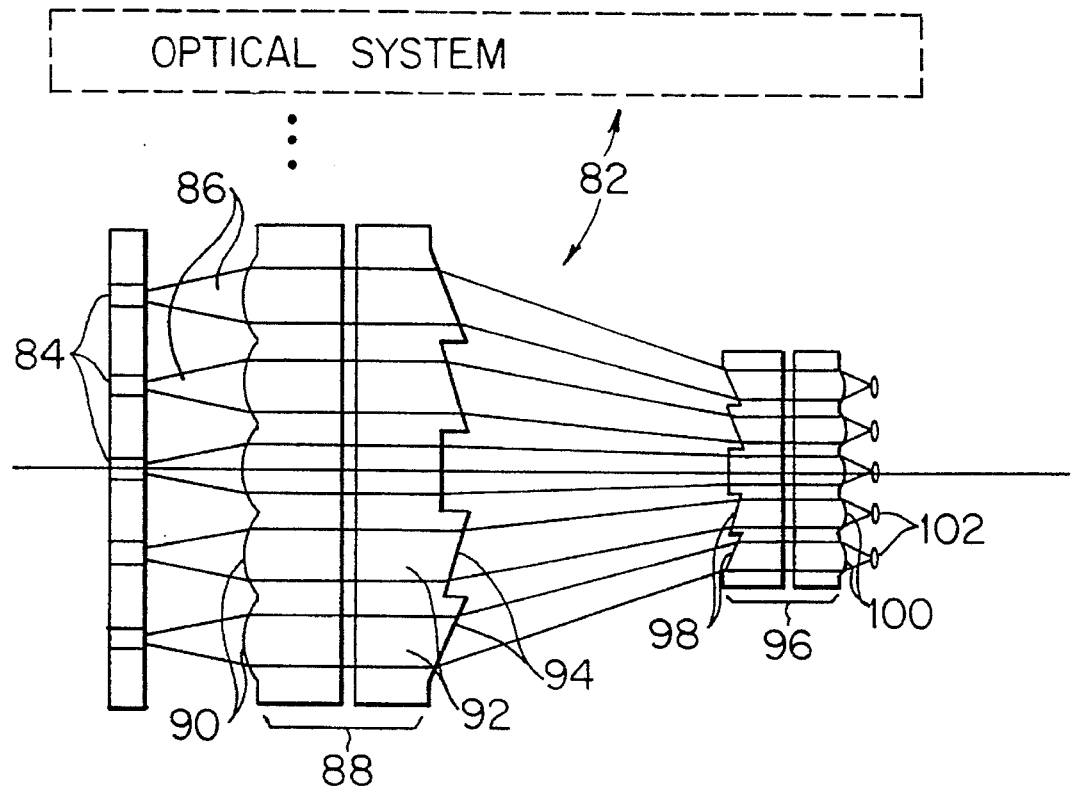
FIG. 5 is a schematic view of an optical system in accordance with the present invention for compressing or expanding a plurality of beams.
Figure 5B:
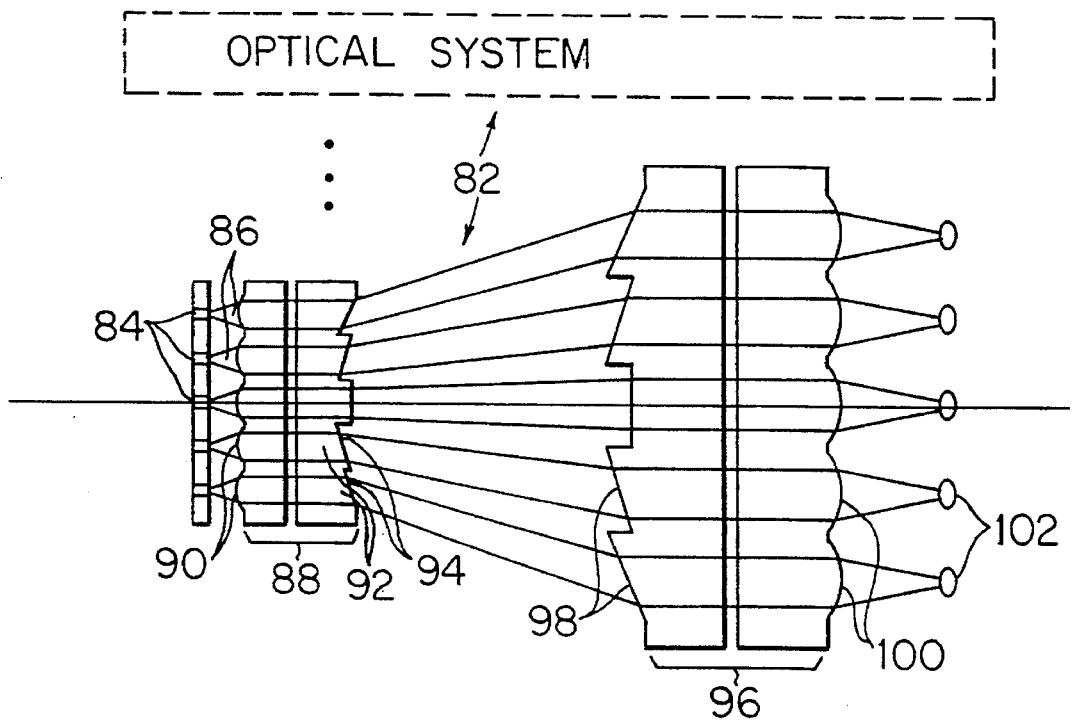

Referring now to FIG. 5, there is shown a schematic view of an optical system 82 in accordance with the present invention for compressing the spacing between a plurality of beams of light. Optical system 82 comprises an object region formed by a plurality of spaced light sources 84, such as laser diodes, each emitting a separate beam of light 86. The beams of light 86 are directed into an optical delivery system. The optical delivery system comprises a first lens 88 having on its surface facing the light sources 84 a plurality of individual curved micro lenses 90, one for each beam of light 86. The micro lenses 90 are designed to slightly converge the beams of light 86 so that a plurality of slightly converging beams of light 92 pass through the first lens 88. On the opposite surface of the first lens 88 are a plurality of prismlets 94, one for each of the converging beams of light 92. The prismlets 94 are designed to direct the converging beams of light 92 toward each other.

A second lens 96 is mounted along a plane which extends across the collimated beams of light 92 where they are closer to each other. The second lens 96 has on its surface facing the first lens 88 a plurality of individual prismlets 98, one for each of the collimated beams of light 92. The prismlets 98 are designed to direct the converging beams of light 92 along paths parallel to the axis of the second lens 96. On the other surface of the second lens 96 are a plurality of rounded micro lenses 100, one for each of the converging beams of light 92. Each of the micro lenses 100 is designed to focus its respective converging beam of light 92 to a separate spot 102 in an image region. Since the beams of light 92 are moved closer together by the prismlets 94 of the first lens 88, the image points 102 are closer together than the spacing between the light sources 84. Thus, the light beams have been compressed. However, if the light sources were directed in the opposite direction through the optical system 82, i.e. first through the second lens 96 and then through the first lens 88, the light beams can be expanded. Thus, the optical system 82 can be used to either compress or expand the spacing of a plurality of light sources without expanding or compressing the beam diameters by a similar amount. Changing the focal lengths of micro lenses 100 will change the diameters of image points 102 without changing the spacing between them.

Figure 6A:
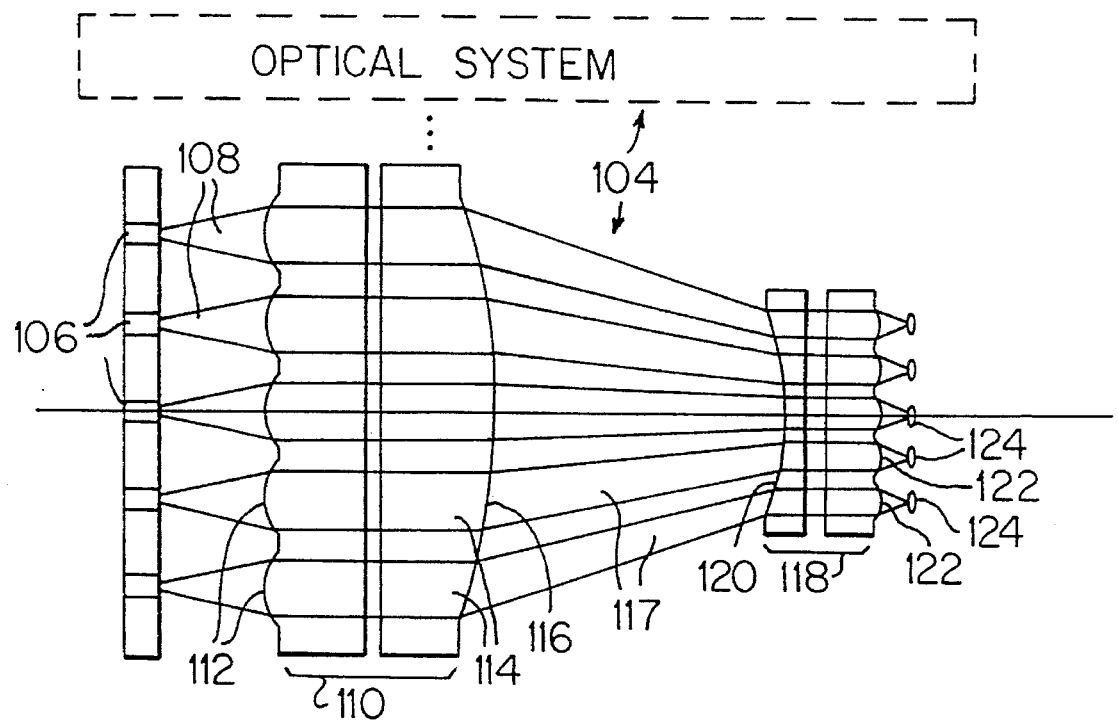
FIG. 6 is a schematic view of another optical system in accordance with the present invention for compressing or expanding a plurality of beams.
Figure 6B:
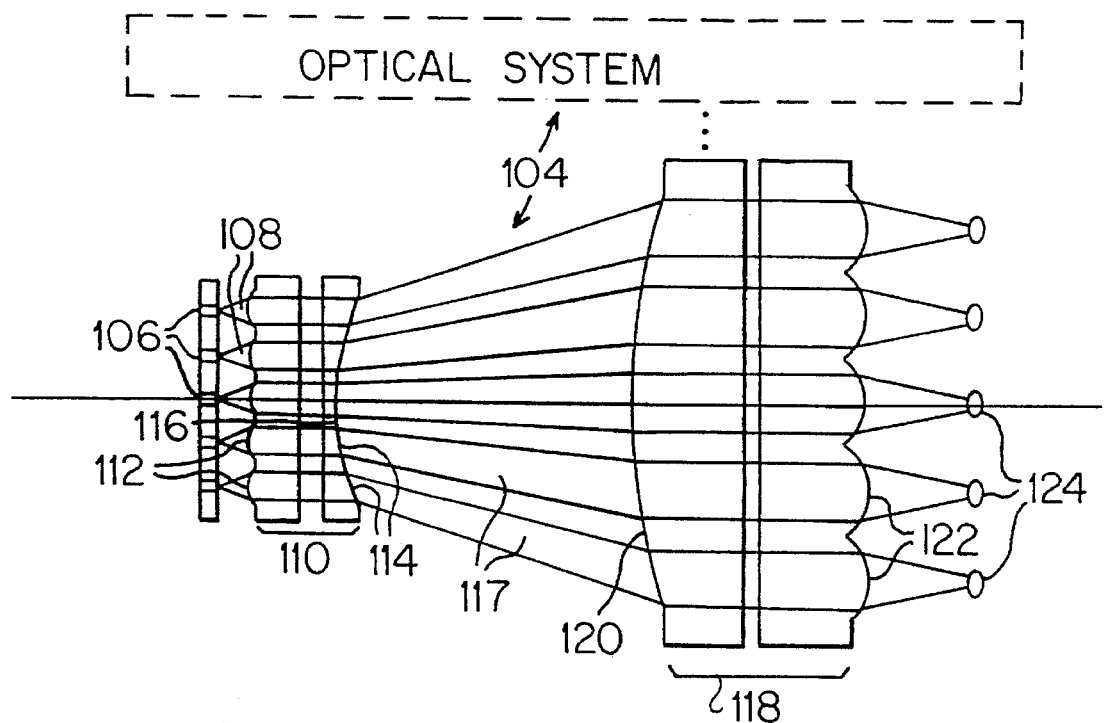

Referring now to FIG. 6, there is shown a schematic view of a further optical system 104 in accordance with the present invention for compressing the spacing between a plurality of beams of light. Optical system 104 comprises an object region formed by a plurality of spaced light sources 106, such as laser diodes, each emitting a separate beam of light 108. The beams of light 108 are directed into an optical delivery system. The optical delivery system comprises a first lens 110 having on its surface facing the light sources 106 a plurality of individual curved micro lenses 112, one for each beam of light 108. The micro lenses 112 are designed to collect the beams of light 108 so that a plurality of modified beams of light 114 pass through the first lens 110. On the opposite surface of the first lense 110 is a first macro lens surface 116. The first macro lense surface 116 is designed to produce a slight convergence in them and to direct the converging beams of light 117 toward each other.

A second lens 118 is mounted along a plane which extends across the converging beams of light 117 where they are closer to each other. The second lens 118 has on its surface facing the first lens 110 a second macro lens surface 120. The second macro lens surface 120 is designed to direct the beams of light 117 along paths parallel to the axis of the second lens 118. On the other surface of the second lens 118 are a plurality of rounded micro lenses 122, one for each of the beams of light 117. Each of the micro lenses 120 is designed to focus its respective beam of light 117 to a spearate spot 124 in an iamge region. Since the beams of light 117 are moved closer together by the first macro lens surface 116 of the first lens 110, the image points 124 are closer together than the spacing between the light sources 106. Thus, the light beams have been compressed. However, if the light sources were directed in the opposite direction through the optical system 104, i.e. first through the second lense 118 and then through the first lens 110, the light beams can be expanded. Thus the optical system 104 can be used to either compress or expand the spacing of a plurality of light sources without expanding or compressing the beam diameters by a similar amount.

Thus, there is provided by the present invention an optical system which includes an optical delivery system between an object region and an image region which is capable of focusing beams from a plurality of light sources to a single spot of relatively small diameter with the spot of light at the image region having the combined power of all of the beams from the light sources in the image region. Also, the optical system is capable of compressing or expanding the area of light beams from a plurality of light sources. This is achieved by reducing or enlarging the spaces between the beams of light by means of the optical delivery system.

It is to be appreciated and understood that the specific embodiments of the invention are merely illustrative of the general principles of the invention. Various modifications may be made consistent with the principles set forth. For example, various type of light sources can be used instead of laser diodes, such as light emitting diodes (LEDs). Also, various type of lens configurations can be used as long as they achieve the result of having $y_o w_o$ different from $y_i w_i$.

What is claimed is:

1. An optical system comprising:

an object region having a light source which emits light in a plurality of optical beams which extend at different angles from said light source, each of said optical beams representing the emission of a different optical mode; and a first lens having means for collimating said optical beams so as to propagate parallel to an axis of said first lens, said means comprising a spherical aberration and being substantially responsible for said collimation.

2. The optical system recited in claim 1, further comprising a second lens for receiving said optical beams from said first lens and focussing said optical beams into a single spot of light.

3. The optical system recited in claim 2, wherein said first lens and said second lens are combined into a single lens.

4. The optical system recited in claim 2, wherein said first lens is integrated to said light source.

5. The optical system recited in claim 1, further comprising a plurality of said systems.

6. The optical system recited in claim 1 wherein said spherical aberration is equal to or greater than one half of an optical wavelength of the optical beam.

7. An optical system comprising;

an axis;

an object region having a light source which emits light in a plurality of optical beams which extend at different angles from said light source, each of said optical beams representing the emission of a different optical mode, a first order mode appearing to originate from a first point on said axis, at least another order mode appearing to originate from a second point on said axis, said second point being different from said first point; and a first lens having means for providing the appearance that said optical beams have originated from substantially the same point of said axis, said means comprising a spherical aberration and being substantially responsible for said collimation.

8. The optical system recited in claim 7 wherein said spherical aberration is equal to or greater than one half of an optical wavelength of the optical beam.

9. The optical system recited in claim 7, further comprising a second lens for receiving said optical beams from said first lens and focussing said optical beams into a single spot of light.

10. The optical system recited in claim 9 wherein said first lens and said second lens are combined into a single lens.

11. The optical system recited in claim 7 wherein said first lens is integrated to said light source.

12. The optical system recited in claim 7, further comprising a plurality of said systems.

* * * * *